United States Patent [19]

Chagnot

[11] 4,406,124
[45] Sep. 27, 1983

[54] HERMETICALLY SEALED TRANSMISSION SYSTEM FOR A FREE PISTON STIRLING ENGINE

[75] Inventor: Bruce J. Chagnot, Athens, Ohio

[73] Assignee: Sunpower, Inc., Athens, Ohio

[21] Appl. No.: 345,313

[22] Filed: Feb. 3, 1982

[51] Int. Cl.³ ............................................. F02G 1/00
[52] U.S. Cl. ...................................... 60/520; 60/517; 277/237 R
[58] Field of Search .................. 60/517, 520; 277/15, 277/29, 237 R

[56] References Cited

U.S. PATENT DOCUMENTS 3,568,436  3/1971  Heffner et al. ........................ 60/517
3,848,877  11/1974  Bengtsson et al. .................... 60/517 X
4,257,230  3/1981  Lundholm ............................ 60/517

Primary Examiner—Allen M. Ostrager
Assistant Examiner—Stephen F. Husar
Attorney, Agent, or Firm—Frank H. Foster

[57] ABSTRACT

A torsionally flexible seal formed with alternating layers of elastic and reinforcing material provides a gastight barrier between a drive shaft and a portion of the Stirling engine housing surrounding a passageway through which the drive shaft extends. The shaft is connected to a series of mechanical linkage devices located within the housing which transmits power between the linearly reciprocative power piston and rotationally reciprocative drive shaft and which eliminates substantially the side forces exerted on the piston.

2 Claims, 6 Drawing Figures

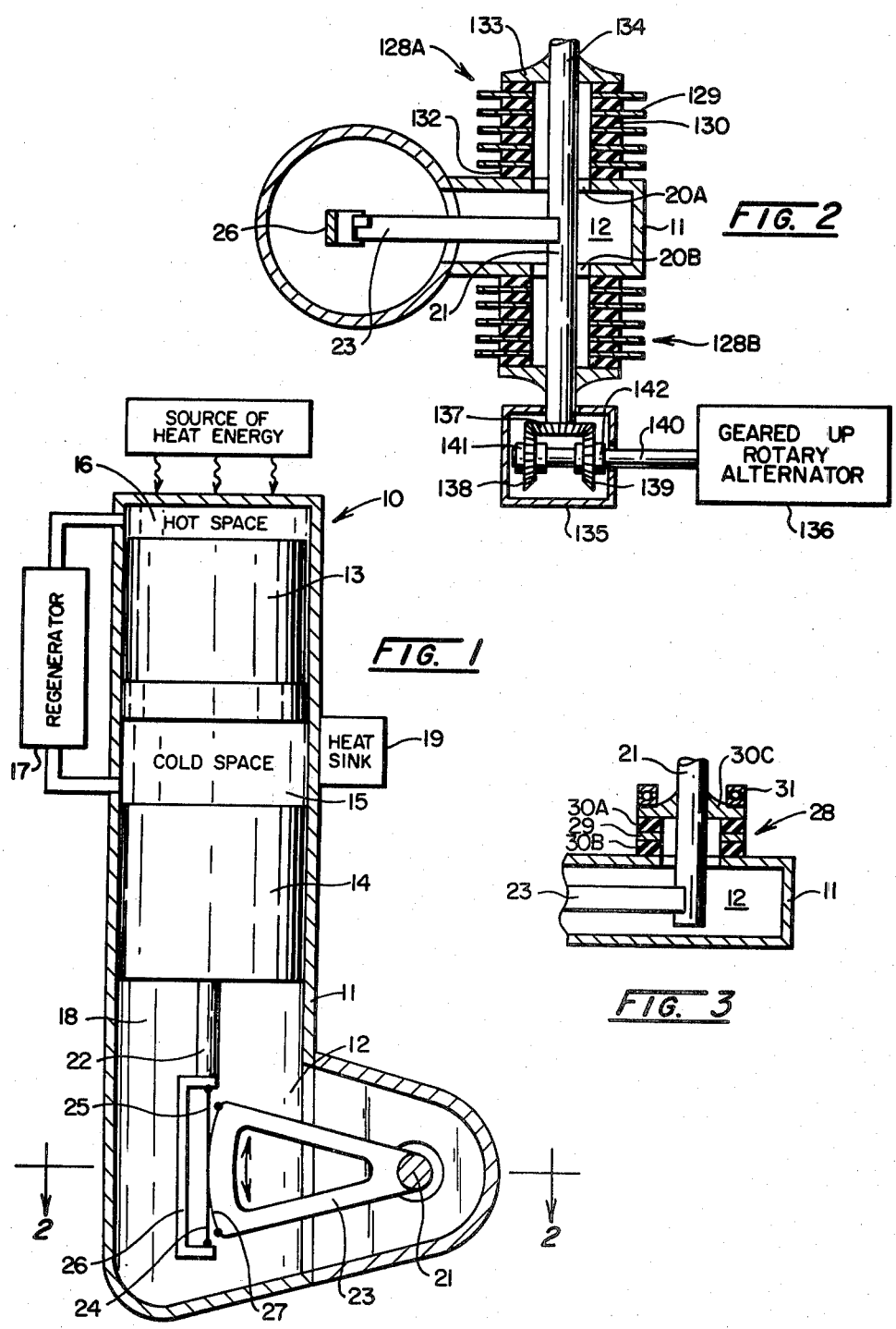

HERMETICALLY SEALED TRANSMISSION SYSTEM FOR A FREE PISTON STIRLING ENGINE

BACKGROUND OF THE INVENTION

The present invention relates to free piston Stirling cycle engines and more particularly to those which transmit mechanical energy between the power piston and a device or devices positioned outside a gas-containing chamber defined by the engine housing.

The operation of a free piston Stirling engine depends upon, among other things, the maintenance of a gas-containing bounce or reference space in communication with a power piston. If power is to be transmitted by mechanical means, however, the power piston must be accessible from a position outside this gas-containing chamber so that the mechanical means can link the power piston to a device outside the engine. Hence, a gas-tight seal must be provided around a moving object extending through the engine housing.

U.S. Pat. No. 3,937,018 issued Feb. 10, 1976 to the present inventor discloses a simple, rolling or bellows type seal extending inwardly from the housing in surrounding relation to a linearly reciprocative piston rod. A major drawback of the seal is the loss of flexibility which results when its strength or durability is increased. In the present invention, however, a torsionally flexible seal surrounds a rotationally reciprocative drive shaft. This combination permits the seal to be internally reinforced, and consequently more durable, without dampening substantially the stroke of the power piston.

U.S. Pat. No. 3,664,202 issued May 23, 1972 to Metzger discloses a composite torsion tube which provides a gas-tight seal between an oscillatory shaft which it surrounds and the wall of a chamber under pressure. The Metzger torsion tube may be provided, as illustrated, with structurally weakened internal layers, whereas the present invention has at least one intermediate layer of reinforcing material bonded between relatively opposing layers of elastic material.

The problem in a Stirling engine of the type described is to provide a seal which is elastic enough to permit multiple repetitions of substantial angular reciprocation of a shaft extending through a wall and yet stiff enough to resist a high gas pressure tending to force it out of the wall.

SUMMARY AND OBJECTS OF THE INVENTION

A free piston Stirling engine is provided with a housing that defines a gas-containing chamber variably partitioned by a displacer and a linearly reciprocative power piston. The power piston is accessible from a position outside the gas-containing chamber through a passageway formed in the housing. The above defined Stirling engine is further provided with: a drive shaft extending through the passageway and mounted for rotationally reciprocative movement around its longitudinal axis; means located within the housing for transmitting mechanical energy between the power piston and drive shaft; and a torsionally flexible seal surrounding a portion of the drive shaft and including an intermediate layer of reinforcing material bonded to relatively opposing layers of elastic material to form a gas-tight barrier between the drive shaft and housing.

The primary object of the present invention is to provide a durable torsionally flexible seal which is very flexible in its direction of normal operation so that it does not impede substantially the rotationally reciprocative movement of the drive shaft to which it is attached and yet is rigid enough in the direction of gas forces that it can withstand high gas pressures without being blown out or deformed to permit leakage.

Another object of the present invention is to provide a hermetically sealed, mechanical transmission system for a free piston Stirling engine which allows the oscillation amplitude of the power piston to vary substantially as it does in the absence of such a system and still is capable of withstanding high gas pressures.

Still another object of the present mechanical transmission system is to minimize side forces exerted by the system on the power piston of a Stirling engine.

Further objects and advantages of the present invention will be more apparent with reference to the following drawings and detailed description.

BRIEF DESCRIPTION OF THE DRAWINGS

FIG. 1 is a diagrammatic view of a free piston Stirling engine particularly illustrating internal linkage devices of the type contemplated in the present invention;

FIG. 2 is a horizontal cross sectional view taken along line 2—2 of FIG. 1 and illustrating a preferred embodiment of the present invention attached to a device lying outside the Stirling engine;

FIG. 3 is a fragmentary, horizontal cross sectional view particularly illustrating an alternative embodiment of a torsionally flexible seal contemplated in the present invention;

DETAILED DESCRIPTION OF THE PREFERRED EMBODIMENTS

Figure 4:
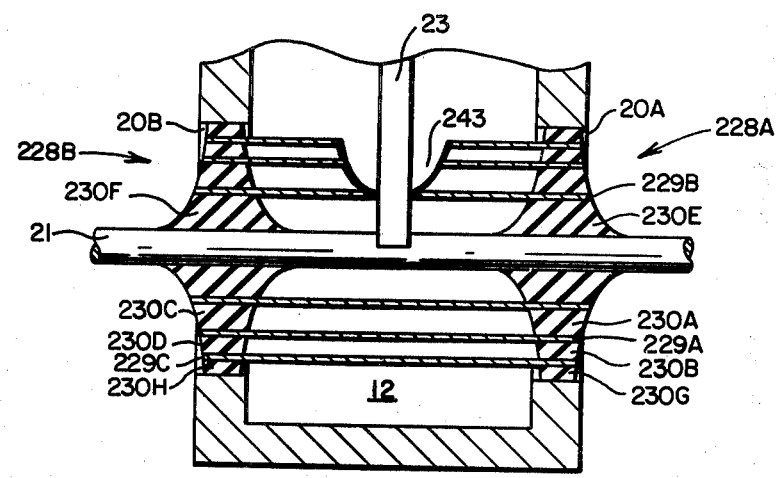
FIG. 4 is an enlarged horizontal cross sectional view particularly illustrating another alternative embodiment of a torsionally flexible seal.

As illustrated in FIG. 1, a free piston Stirling engine, generally designated 10, includes a housing 11 which defines a gas-containing chamber 12 containing a displacer 13 and variably partitioned by a linearly reciprocative power piston 14. In the usual manner, the displacer 13 and power piston 14 engage in linearly reciprocal movement out of phase with each other and serve to define the cold space 15 and hot space 16 which are connected through a regenerator 17 to define the work space and also define the reference or bounce space 18. As is well known to those skilled in the art, the displacer of a free piston Stirling device must be in communication with the reference space, such as by means of a displacer rod extending through the power piston so that variations in work space pressure will cause reciprocation of the displacer. However, because the prior art shows that the reference space may be not only in the bounce space, but also in the displacer, in the power piston or in the housing, the particular structure is not illustrated.

As is well known in the art, if heat is applied to the hot space 16 and removed at the cold space 15 via a heat sink 19, a temperature differential sufficient to drive the displacer and power piston may be created, and work may be extracted from the Stirling engine by attaching a device which is driven by the reciprocative power piston. Alternatively, a device which drives the power piston may be attached thereto, and the Stirling engine may be used as a heat pump. The term engine is used to refer to both.

Accordingly, a passageway 20 is formed in the housing 111 to make the power piston accessible from a position outside the gas-containing chamber 12, and a drive shaft 21 mounted for rotationally reciprocative movement extends through said passageway 20.

As illustrated in FIG. 1, means for transmitting mechanical energy between the power piston 14 and the drive shaft 21 are provided within the housing 11. The transmission means consists of a series of linkage devices which preferably includes a piston rod 22 secured at one end to the power piston, an oscillating arm 23 secured at one end to the drive shaft 21, and spaced apart, flexible straps 24 and 25 each secured at one end to the piston rod and at its other end to the oscillating arm. The piston rod 22 is axially aligned with the power piston and may be provided with a relatively inset portion 26. A convex face 27 may be formed on the arm and extend into the space provided by the inset portion 26, so that the axis of the power piston, if it were extended through the piston rod, would intersect only a small segment of the convex face 27 during the motion of the oscillating arm. The flexible straps 24 and 25 are formed from relatively non-expansible material and are secured, respectively, at opposite ends of the inset portion 26 in axial alignment with the power piston and at opposite ends of the convex face 27. The straps lie in crossing relation to one another; hence, one of said straps is provided with an elongated, central slot (not shown) through which the other passes. The above-described series of linkage devices is preferred because it reduces significantly undesirable side forces which might otherwise be exerted upon the power piston and because it requires minimal lubrication. Alternatively, however, the flexible straps 24 and 25 may be eliminated, and the inset portion 26 and convex face 27 may be replaced, respectively, with a gear rack and a toothed sector or the like.

As illustrated in FIG. 3, a torsionally flexible seal 28 surrounding a portion of the drive shaft 21 includes an intermediate layer of reinforcing material 29 bonded to relatively opposing layers of elastic material 30A and 30B and forms a gas-tight barrier between a hub 30C fixed to the drive shaft 21 and the housing 11. Each layer of elastic material 30A and 30B comprises a tubular washer-like segment of an elastomer, such as rubber, which is torsionally flexible. By fabricating the relatively opposing layers 30A and 30B from material which is sufficiently flexible, the Stirling engine continues to react as a completely free piston machine, inasmuch as the variable stroke amplitude of the power piston is substantially unhampered by the torsionally flexible seal. The intermediate layer of reinforcing material 29 may be fabricated from any substantially non-expansible material such as metal, some synthetic resins, or certain fabrics, such as KEVLAR. The reinforcing layer 29 provides the pressure holding capability of the seal by countering the radially outwardly directed pressure of the gas from the chamber 12. In addition, the torsionally flexible seal 28 may be provided with a thrust bearing 31 to counteract the axially outwardly directed force exerted by the gas on the hub 30C.

Preferably, however, and as particularly illustrated in FIG. 2, the Stirling engine housing 11 is provided with relatively opposing passageways 20A and 20B and with a drive shaft 21 extending through both passageways. In addition, substantially identical, first and second torsionally flexible seals, generally designated 128A and 128B, are provided. Each of said seals includes a plurality of axially aligned, alternating layers of reinforcing and elastic material 129 and 130, respectively, and forms a longitudinally extending tube fixed at opposite ends to the housing 11 and to the hub 133 fixed to a portion 134 of the drive shaft 21 lying outside the gas-containing chamber 12. In this manner the torsional flexibility of the seal is enhanced by adding additional layers of intermediate reinforcing elements and opposing elastic layers to the seal illustrated in FIG. 3. Each layer of elastic material 130 comprises a tubular cylindrical segment of elastomer, and each layer of reinforcing material 129 comprises a centrally-bored, circular metal disc or washer. It will be noted, however, that the metal discs or washers 129 extend radially outwardly a greater distance than the cylindrical segments of elastomer 130. In this manner, said metal washers act as cooling fins to dissipate heat generated in the elastic layers as the drive shaft reciprocates. Advantageously, the need for the thrust bearing 31 illustrated in FIG. 3 is obviated in the embodiment illustrated in FIG. 2, because the combination of the drive shaft 21 secured to relatively opposing seals 128A and 128B counteracts the axially outwardly directed force of the gas from the chamber 12.

Also as illustrated in FIG. 2, the rotationally reciprocative motion of the drive shaft 21 may be converted by suitable means, such as a hydraulic pump or as illustrated by a sprag clutch mechanism 135, into unidirectional rotary motion which, in turn, may be used to drive a load, such as a rotary alternator 136. The sprag clutch mechanism 135 comprises essentially an input bevel gear 137 secured to the drive shaft and a pair of output bevel gears 138 and 139 in meshing engagement with diametrically opposing portions of the input gear 137 and mounted on a rotary output shaft 140 by means of oppositely polarized sprag clutches 141 and 142, respectively. As the drive shaft 21 rotates in one direction, one of the output gears, by means of its associated sprag clutch rotates the output shaft 140. The other output gear rotates freely on the output shaft during this interval. As the drive shaft rotates in the opposite direction, the other output gear, by means of its associated sprag clutch engages the output shaft and rotates it in the same direction as previously established. In this manner, unidirectional rotary motion is provided by the output shaft which, in turn may be connected to a rotary alternator 136 or some other load driven by unidirectional, as opposed to a reciprocal, rotary motion. Of course, the shaft 134 could also drive a load in reciprocating rotary motion.

Figure 5:
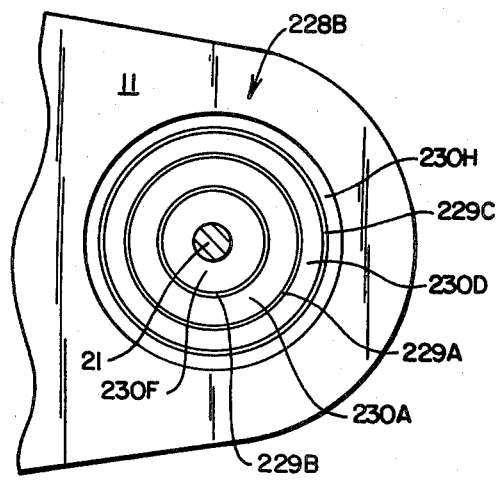
FIG. 5 is a fragmentary side elevational view of the housing, drive shaft and torsionally flexible seal illustrated in FIG. 4.

As illustrated in FIGS. 4 and 5, first and second torsionally flexible seals, generally designated 228A and 228B may be provided with at least one common intermediate layer of reinforcing material 229A and with relatively opposing layers of elastic material 230A and 230B concentrically aligned within the first passageway 20A and wit relatively opposing layers of elastic material 230C and 230D concentrically aligned within the second passageway 20B. Preferably, however, there are a plurality of common intermediate layers of reinforcing material and a plurality of opposing layers of elastic material alternating with the intermediate reinforcing layers. The common intermediate layers of reinforcing material 229A, 229B and 229C are preferably composed of inelastic fabric and form a series of concentric sleeves embedded or bonded at opposite ends between opposing layers of elastic material. The reinforcing layers are provided with an opening 243 through which the oscillating arm 23 extends, so that they do not become entangled or interfere with the transmission of mechanical power between the power piston 14 (FIG. 1) and the drive shaft 21. Since the elastic layers are concentrically aligned with the passageways 20A and 20B, most of the force exerted by the gas from the engine chamber 12 on the seals is axially outwardly directed. By providing common reinforcing layers between the relatively opposing seals, the drive shaft is aided in counteracting the force of the gas in these directions. It will also be noted that the shaft-anchoring, central elastic layers 230E and 230F are the widest in axial dimension and that the layers become progressively narrower toward the housing-anchored, peripheral elastic layers 230G and 230H, thus dispersing the sheer forces generated by the shaft motion more evenly through the torsion seals. For the same purpose the layers are also preferably made progressively thinner toward the outer layers and desirably both the width and the thickness become proportionately and progressively thinner the further from the central axis they are positioned.

Figure 6:
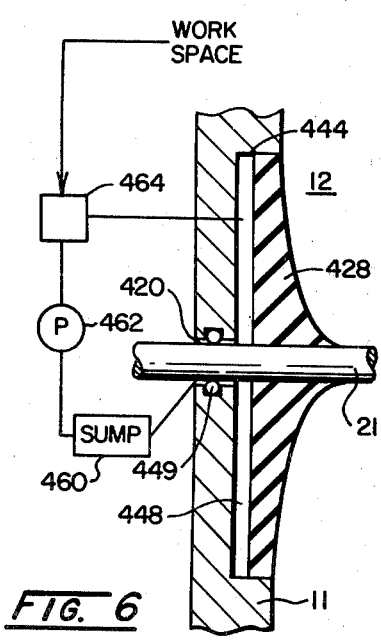
FIG. 6 is an enlarged, fragmentary cross sectional view of a further alternative embodiment of a torsionally flexible seal according to the present invention.

Finally, as illustrated in FIG. 6, a torsionally flexible seal 428 may be formed from a single piece of elastic material extending radially between the drive shaft 21 and the housing 11. The seal 428 is mounted within the gas containing chamber 12 and, preferably, within a recess 444 formed in the housing to which the peripheral edges of the seal are tightly secured. In addition, a layer of lubricating fluid 448, such as oil, is trapped between the seal and the housing by means of an O-ring 449 or the like. In this manner, the housing itself serves to reinforce the elastic, torsionally flexible seal 428, and the lubricating fluid reduces the friction created therebetween as the seal twists in response to the oscillating shaft. The oil may completely lift the elastomer away from the housing. The O-ring is mounted in a relatively restricted passageway 420 formed in the housing and may be constructed so that the supply of lubricating fluid may be easily replenished. Since it is much easier to seal a liquid than a gas, such an arrangement does not unduly sacrifice the generally maintenance-free characteristic of the present Stirling engine.

Preferably a sump is attached to receive oil which leaks past the O-ring 449. The sump is connected through an oil pump 462 to a pressure equalizer 464. The pressure equalizer is a pressure regulator which is connected through a small orifice to the Stirling engine work space. It operates to regulate the pressure from the pump 462 so that the oil pressure in the oil containing space 448 between the seal and the housing is maintained at a pressure which is equal to the average pressure of the gas in the work space. In this manner the seal 428 is supported in position and oil is replenished as it may leak past the O-ring 449.

In view of the foregoing, it will be seen that the present, hermetically sealed transmission system provides a durable, substantially non-impeding means of transferring mechanical power to or from a free-piston Stirling cycle engine. While preferred embodiments of the present invention have been illustrated and described in detail, it will be understood that various modifications in details of construction and design may be made without departing from the spirit of the invention or the scope of the following claims.

I claim:

1. In a free piston Stirling cycle engine provided with a housing that defines a gas-containing chamber variably partitioned by a displacer and a linearly reciprocative power piston, said power piston being accessible from a position outside said gas-containing chamber through a passageway formed in said housing, that improvement which comprises:
    (a) a drive shaft extending through said passageway and mounted for rotationally reciprocative movement around its longitudinal axis;
    (b) means located within the housing for transmitting mechanical energy between said power piston and said drive shaft;
    (c) a torsionally flexible seal mounted within said gas-containing chamber in surrounding relation to said drive shaft and secured along its peripheral edges to said housing to form a gas-tight barrier between said drive shaft and said housing; and
    (d) a layer of lubricating fluid trapped between said housing and said torsionally flexible seal.

2. A Stirling engine according to claim 1 further comprising a pump and pressure regulating means connected to receive fluid leaking from said trapped fluid and to pump it back.

* * * * *